United States Patent [19]

Rugh, II

[11] 4,102,752

[45] Jul. 25, 1978

[54] MUNICIPAL WATER SUPPLY SYSTEM

[76] Inventor: John L. Rugh, II, Box 128, R.D. #5, Johnstown, Pa. 15905

[21] Appl. No.: 703,777

[22] Filed: Jul. 9, 1976

[51] Int. Cl.² .................. B01D 3/00; G21C 15/16
[52] U.S. Cl. ................................ 202/180; 202/234; 159/DIG. 12; 179/39; 203/2; 203/11; 203/100; 203/DIG. 16; 203/DIG. 8; 210/152
[58] Field of Search ............. 203/11, 2, 100, DIG. 16, 203/DIG. 20, DIG. 17, DIG. 8; 202/234, 176, 160, 180; 159/DIG. 12; 176/39, 54–56; 210/152

[56] References Cited

U.S. PATENT DOCUMENTS

| | | | |
|---|---|---|---|
| 2,441,361 | 5/1948 | Kirgan | 202/160 |
| 2,515,013 | 7/1950 | Kruhmin | 203/DIG. 20 |
| 3,032,482 | 5/1962 | Shoemaker | 203/DIG. 20 |
| 3,109,781 | 11/1963 | Natland | 176/39 |
| 3,168,451 | 2/1965 | Gorand | 202/160 |
| 3,211,625 | 10/1965 | Setterwall | 176/54 |
| 3,222,255 | 12/1965 | Maldague | 176/39 |
| 3,284,310 | 11/1966 | Strååt | 176/54 |
| 3,303,098 | 2/1967 | Lagowski | 176/39 |
| 3,336,207 | 8/1967 | Peterson | 203/DIG. 20 |
| 3,480,515 | 11/1969 | Goeldner | 176/39 |
| 3,607,634 | 9/1971 | Gerard | 176/54 |
| 3,620,916 | 11/1971 | Hilborn | 176/54 |
| 3,741,890 | 6/1973 | Smith et al. | 210/152 |

Primary Examiner—Wilbur L. Bascomb, Jr.
Attorney, Agent, or Firm—Shlesinger, Arkwright, Garvey & Dinsmore

[57] ABSTRACT

A municipal water supply system for providing potable water under pressure from sea water including a nuclear reactor heated boiler for raising the temperature of sea water to at least 250° F and at superatmospheric pressure means for conveying the superheated steam to an expansion turbine, whereby the superheated steam drives the turbine while the temperature of the steam is reduced to about the boiling point of water at atmospheric pressure, a heat exchanger for condensing the exhaust from the turbine while simultaneously preheating incoming sea water to the system, and liquid pumping means driven by the expansion turbine for conveying the condensed water under pressure to a municipal distribution system. Additionally, means are provided for controlling the temperature within the boiler chamber by controlling the volume of incoming sea water.

2 Claims, 1 Drawing Figure

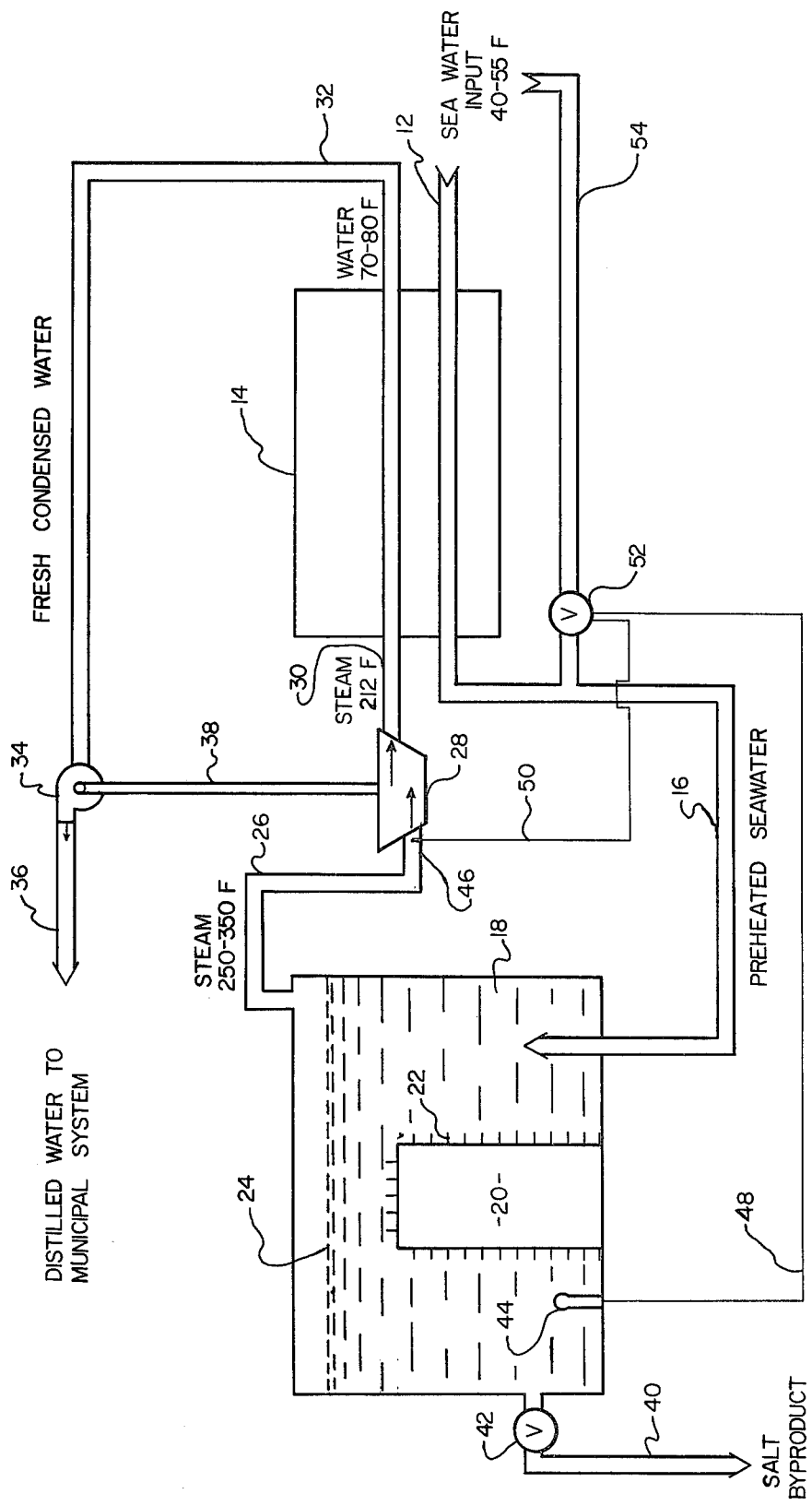

MUNICIPAL WATER SUPPLY SYSTEM

This invention relates to a municipal water supply system for delivering potable water under pressure. More particularly, this invention relates to a municipal water supply system for providing potable water derived from sea water.

BACKGROUND AND OBJECTS

In recent times, considerable research effort has been directed toward improving municipal water supply systems. Additionally, considerable research has been directed to the problem of recovering potable water from sea water. In general, however, most sea water desalination efforts have been limited to relatively small scale systems for individual emergency use, for use by ships at sea, and the like. On the other hand, the needs of a municipal water system are far greater than prior desalination systems were capable of fulfilling.

Small scale desalination systems so typical of the prior art have been solar stills for individual use capable of producing but a few gallons of fresh water a day, or slightly larger systems capable of supplying water to a small ship or similar vessel.

Yet, a significant need exists for the ability to produce potable water for municipal purposes from sea water, as well as to provide sufficient potable water for other purposes such as irrigation of arid areas.

The great majority of municipal water supply systems presently in use entail large reservoirs for maintaining a supply of water and chemical purification plants for treating the water before it is admitted to the distribution system. However, in recent years, the cost of such water purification systems has increased phenomenonly due to the cost of the required chemicals, the cost of labor for operating such systems, and other related operating costs. Moreover, the size of the reservoirs required to supply adequate water to large cities is often prohibitive in terms of a single reservoir, requiring the construction of several reservoirs to meet the need. The capital investment required for establishing such a system of reservoirs of course will drastically affect the ultimate price to be paid for the water.

Although many areas are naturally suited for construction of a reservoir, there are likewise many areas which are extremely flat and thus, not well suited for construction of a reservoir. Similarly, where it is necessary to supply the water under pressure to a municipal distribution system, the pressure is either obtained by elevated storage tanks providing gravitational pressure or by electrically driven pumping stations. Yet, such pressure delivery systems are economically unattractive because of the capital and operating expenses attendant thereto.

The present invention overcomes the disadvantages of prior art municipal water systems by providing a water supply system capable of converting sea water into potable water with minimal energy cost requirements and maximum output. According to this invention, a nuclear reactor core is utilized as the source of heat for heating sea water to an elevated temperature and pressure to generate superheated steam. The superheated steam in turn is exhausted from the boiler chamber to an expansion turbine where the temperature and pressure of the steam is reduced, and thereafter the steam is conveyed to a heat exchanger where the steam preheats the incoming sea water and is condensed to water at a sufficiently low temperature for immediate distribution to the municipal system. Meanwhile, the turbine is operatively connected to a suitable pump capable of delivering the distilled, potable water under pressure to a municipal distribution system. Because the turbine powered pump is capable of generating high pressures for transporting the condensed water, the system may be located at, or even below, sea level which was of course completely impractical in prior art systems.

Moreoever, a temperature control system for the reactor heated boiler is provided wherein sensors monitor the system temperatures in the boiler chamber and in the superheated steam line so as to prevent overheating, and thus thermal runaway, of the reactor core. In the event that temperatures are elevated above a safe operational limit, the thermal sensors serve to actuate a valve allowing incoming water to by-pass the preheat heat exchanger thus feeding additional cool water into the boiler to cool the reactor core.

Accordingly, it is a primary object of this invention to provide a municipal water supply system which overcomes the disadvantages of prior art systems.

Another object of this invention is to provide a municipal water supply system capable of deriving potable water from sea water.

A further object of this invention is to provide a municipal water supply system utilizing a nuclear reactor in a sea water desalination system.

Still another object of this invention is to provide a municipal water system capable of meeting the water needs of a large city.

Yet, a further object of this invention is to provide a nuclear powered sea water desalination system provided with means to prevent thermal runaway.

These and other objects and advantages of this invention will become apparent when considered in light of the following description and claims when taken together with the accompanying drawing which is a schematic representation of the system of this invention.

DESCRIPTION OF THE INVENTION

Referring to the drawing, the sea water to be treated according to the invention is fed into the system by an intake pipe 12. Sea water is typically at a temperature of about 40°–55° F although colder or warmer water may be encountered. The incoming sea water passes through a heat exchanger illustrated diagrammatically at 14. The heat exchanger is of a type well known to the prior art and may be a single or plural stage heat exchanger. Preferably, the incoming sea water is preheated in the heat exchanger 14 to a temperature of at least 125° F and preferably greater than 150° F. The preheated sea water passes through an appropriate conduit 16 whereby it is conveyed to boiler chamber 18. Within boiler chamber 18 is a nuclear reactor core 20 of a type and size which may be readily determined for the particular installation. The reactor 20 may be either a fision or fusion type, as is known in the art. Illustrated schematically are fins 22 indicative of means for conveying the heat from the reactor core 20 to the sea water in the boiler chamber 18. The liquid level 24 in the boiler 18 should be maintained at a level so as to completely surround the core 20.

As the liquid in the chamber 18 is heated by the reactor core 20, steam is generated and is heated to a temperature of at least about 250° F and may be considerably higher e.g. 350° F or more. This of course requires maintenance of superatmospheric pressure. The high temperature, high pressure steam passes out of the boiler 18 through a conduit 26 by which it is delivered to an expansion turbine 28 of known construction. In driving the turbine 28, the steam is cooled to about the boiling point of water at the prevailing atmospheric pressure, and the steam is exhausted from the turbine 28 through a line 30 whereby it is conveyed into heat exchanger 14. Of course heat exchanger 14 is illustrated schematically but in the heat exchanger 14, the steam exhausting from the turbine 28 is maintained in heat exchange contact with the incoming sea water supplied through intake pipe 12. The steam in the heat exchanger 14 is cooled and condensed, to the extent that the exit line 32 carries potable water, i.e. water at a temperature of about 70°–80° F. This water is delivered by the exit line 32 to a pump 34 capable of delivering a high volume of water under pressure through line 36 to a municipal water distribution network. The pump 34 is operatively connected to and driven by the turbine 28 by means of shaft 38 or other similar such connection. Of course reduction gearing may be utilized between the turbine 28 and pump 34, but such an arrangement is known in the art.

The steam leaving the boiler 18 through line 26 is of course substatially pure water, having been distilled from the sea water. As the pure water is removed, the concentration of salts in the boiler 18 increases, settling towards the lower portion of the boiler. Periodically, the concentrated salt solution is drawn off through line 40 upon opening of valve 42. The solution which would be drawn off in this manner is highly concentrated in the various salts contained in sea water, and it has been found desirable that this highly concentrated salt solution may be evaporated to dryness or otherwise dried and produces a good highway salt for use on icy roads and the like.

In order to prevent thermal runaway of the reactor, it is important to maintain a control over the temperature of the system. To accomplish this, thermal sensors of any suitable type such as thermocouples are used. Two such sensors are illustrated at 44 and 46 in the boiler 18 and the high pressure steam line 26 respectively. Of course sensors may be provided in other portions of the system. The sensors are connected by means of lines 48 and 50 to a thermally responsive valve 52. Of course lines 48 and 50 are illustrated schematically, and if temperature sensors 24 and 46 are typical electrical-type sensors such as thermocouple junctions, bimetallic elements or the like, then lines 48 and 50 will be electrical connections to the valve 52.

Valve 52 is normally closed so that all incoming sea water passes through the heat exchanger 14 and is preheated therein prior to entry into the boiler 18. However, if sensors 44 and/or 46 indicate a rise in temperature beyond the thermal capabilities of the system, valve 52 is opened, thus allowing cold, unpreheated sea water to flow through by-pass line 54 directly into feed line 16 without being preheated in the heat exchanger 14. Since cold sea water is typically at a temperature of 40°–55°, rapid cooling of the system will occur. Of course other types of safeguards on nuclear systems to prevent thermal runaway are known and may also be used to supplement the system described herein.

It has been found advantageous to locate the system as near as possible to a sea level location, preferably on the sea coast. Preferably, gravitational feed is used to supply the incoming sea water, however a pump may also be used if necessary for the particular installation.

It is estimated that the turbine 28 should be capable of generating approximately 5000 horsepower output, which would be adequate to drive the pump 34 and maintain sufficient pressure in the water distribution system. Thus, the fresh water produced by this system may be transported considerable distances to more inland locations. This of course also makes the fresh water available for irrigation purposes. The turbine would also be capable of powering a small electric generator to provide additional electricity which may be required at the installation site.

This system, therefore, takes advantage of the waste heat ordinarily generated by a nuclear reactor to produce fresh water, at minimum operational expense.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. A water supply system for a water distribution system for providing potable water under pressure from sea water comprising:
    (a) a boiler having a boiler chamber for raising the temperature of the sea water to generate high temperature steam of superatmospheric pressure,
    (b) a nuclear reactor core having top and sides having heat radiators thereon,
    (c) said core being mounted within said boiler chamber for directly supply heat to said boiler chamber and having a height and width substantially less than the height and width of said boiler chamber to permit sea water to substantially completely surround and cover said top and sides of said core when said system is in operation,
    (d) a sea water intake line connected to said boiler chamber,
    (e) an expansion turbine including means connecting said turbine to said boiler chamber,
    (f) a steam discharge line connected to said turbine,
    (g) a heat exchange condenser,
    (h) said sea water intake line and said steam discharge line connected to said heat exchange condenser,
    (i) a fresh water discharge line connected to said heat exchange condenser,
    (j) pump means driven by said turbine and connected to said fresh water discharge line and to a water distribution system,
    (k) a sea water intake by-pass by-passing said heat exchange condenser and connected to said boiler chamber,
    (l) valve means for automatically opening said by-pass for bringing cold sea water into said boiler,
    (m) a pair of thermal sensors,
    (n) one of said thermal sensors being positioned in said boiler chamber and the other of said thermal sensors being positioned adjacent said turbine and upstream of said turbine, and
    (o) said valve means responsive to both of said pair of thermal sensors for controlling the flow of cold sea water into said boiler chamber thereby maintaining a proper temperature in said boiler chamber.

2. A water supply system as in claim 1 and including:
    (a) a concentrated salt solution line connected to said boiler chamber for drawing off concentrated salt solution from said boiler chamber.

* * * * *